(No Model.)
H. O. REESE.
TINNER'S TONGS.
No. 309,359. Patented Dec. 16, 1884.
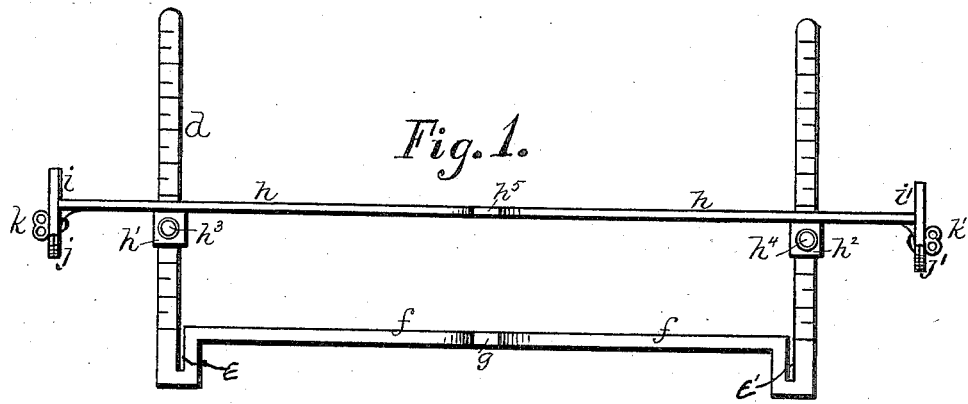
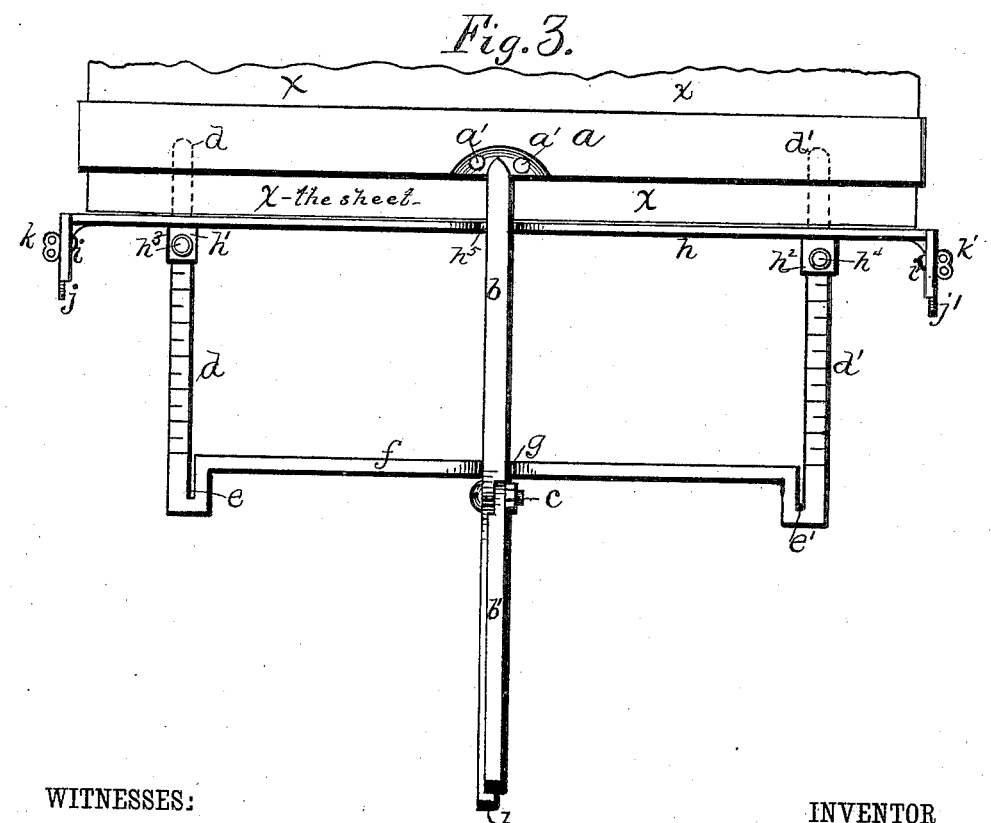
WITNESSES:
Mary E. Wills
James Fisher
INVENTOR
H. O. Reese
BY
S. V. Brashears
ATTORNEY

United States Patent Office.

HENRY O. REESE, OF BALTIMORE, MARYLAND.

TINNER'S TONGS.

SPECIFICATION forming part of Letters Patent No. 309,359, dated December 16, 1884.

Application filed August 7, 1884. (No model.)

*To all whom it may concern:*

Be it known that I, HENRY O. REESE, of Baltimore city, Maryland, have invented certain new and useful Improvements in Tinners' Tongs, of which the following is a specification, reference being had to the accompanying drawings, forming part hereof, in which—

Figure 1 is a view (top plan) of the gaging device removed from the tongs. Fig. 2 is an elevation of the stop-plate thereof, and Fig. 3 is a top plan view of a pair of tongs having the gaging device attached and clamping a piece of tin ready for bending.

Like letters of reference mark the same parts in all the figures.

My invention relates to tinners' tongs, and is in the nature of a gaging device to be combined therewith, whereby the tin to be bent may be so gaged that any width may be turned up, the adjustment reaching from a small fraction of an inch to a width equal to the distance from the front edge of the jaws to the pivot which connects the bars of the shears.

I shall first proceed to fully describe my invention, and then specifically point out the novelty in the claims.

Referring to the drawings by letter, $a$ is one of the blades or jaws of a pair of tinners' tongs, which is attached by rivets $a'$ to one of the bars $b'$. There are two jaws, that not seen being under the jaw $a$, and riveted in a similar manner to the bar $b'$. The bars $b\, b'$ are crossed and pivoted together by rivet $c$.

$d\, d'$ are two graduated bars lying parallel to each other and bent at one end back upon themselves, forming spaces $e\, e'$, which extend to the rear of a cross-bar, $f$, which connects (being made integral with) the bars $d\, d'$. This bar $f$ is bent at the center, so as to form a rectangular space, $g$, in which the bar $b'$ is placed when the parts are in position for use.

$h$ is a cross-bar provided with two sleeves, $h'\, h^2$, which encompass the bars $d\, d'$ and slide thereon, being fixed at any point on said bars by means of set-screws $h^3\, h^4$. The bar $h$ is provided with a bend or space, $h^5$, at its center, similar to the bend $g$ in the bar $f$, which space $h^5$ receives the bar $b$ in a manner similar to that in which said bend $g$ receives the bar $b'$, the bar $h$ passing between the bars $b\, b'$ and the bar $f$ below them.

At the extremities of the bar $h$ are slides $i\, i'$, which may move on the bent ends $j\, j'$ of said bar $h$ at right angles to said bar and the jaws, and are held in any desired position by set-screws $k\, k'$.

The operation of my device is as follows, viz: The parts being in position as shown and described, a sheet of tin, $x$, is placed between the jaws and moved back until its edge strikes the bar $h$, when the portion of the tin between the front edge of the jaws and the plate may be bent over in the usual manner. When it is desired to bend more or less of the tin over, the set-screws $h^3\, h^4$ are loosened and the bar $h$ moved forward or back, as desired, sliding on the bar $b$ and graduated bars $d\, d'$ until the desired point is reached, when the set-screws are again tightened, holding the bar in its adjusted position, and the tongs are again ready for use. The spaces $e\, e'$ allow the sleeves $h'\, h^2$ to pass back far enough to permit the bar $h$ to be brought back against the bar $f$, thus allowing the greatest possible adjustment. When it is desired to bend the tin of a width less than the width of the jaw $a$, the bar $h$ is moved up against the rear side of the jaw and secured there. The slides $i\, i'$ are then moved up so that they will project the proper distance forward of the rear edges of the jaws, and are there fixed, when the edge of the tin may be abutted against the front of these slides and a proper adjustment thereof be had.

By means of my improvements it is possible to gage the width to be bent from the smallest width up to the whole distance from the front of the blades to the pivot $c$. A tinner is thus enabled to work much more expeditiously and with greater ease than with any other device.

Having thus described my invention, what I claim, and desire to secure by Letters Patent, is—

1. A gaging device for tinner's tongs, provided with the bar $h$, moving back and forth on bar $b$, the graduated bars $d\, d'$, and the set-screws $h^3\, h^4$, as and for the purpose set forth.

2. In tinner's tongs, the combination, with the jaws and the bars $b\, b'$, which carry them, of the bar $h$, graduated bars $d\, d'$, the set-screws $h^3\, h^4$, and the bar $f$, connecting the graduated bars, as set forth.

3. The combination of the bar $h$, having bend or space $h^5$, the bars $b\ b'$, the graduated bars $d\ d'$, and their cross-bar $f$, having bend $g$, as and for the purpose set forth.

4. The bar $h$, adapted for adjustment on bars $d\ d'$ and $b$, in combination with the jaws, the slides $i\ i'$, and the set-screws $k\ k'$, as and for the purpose set forth.

In testimony whereof I have signed this specification in the presence of two witnesses.

HENRY O. REESE.

Witnesses:
WM. P. MILLER,
R. BERRY BULL.